July 15, 1958  E. W. HOGUE  2,843,679
CAPACITY-TYPE TRANSDUCER
Filed Aug. 31, 1953

INVENTOR
EPHRAIM W. HOGUE

BY Max L. Libman

ATTORNEY

United States Patent Office 2,843,679
Patented July 15, 1958

2,843,679
CAPACITY-TYPE TRANSDUCER
Ephraim W. Hogue, Bethesda, Md.
Application August 31, 1953, Serial No. 377,339
8 Claims. (Cl. 179—100.41)

This invention relates to capacity-type transducers, but more specifically to a mechano-electrical transducer which generates a voltage proportional to the mechanical displacement of a vibrating member.

The primary object of the invention is to provide a capacity-type or electrostatic transducer suitable for use as a phonograph pick-up, although it will be apparent that such a transducer can be used for other purposes where it is desirable to translate mechanical motion or vibration into an electrical signal which is a function of said motion. For example, it is obvious that the same principle could be applied to a microphone. However, as the most important applications of the herein described transducer presently known to me are in connection with phonograph pick-ups, the physical embodiment of my invention in a phonograph pick-up will be described below. In such a device, it is desirable to have the characteristic of high compliance. Many prior art devices are inherently stiff, or must be coupled to the vibrating source by an attenuating mechanical network which reduces output and fidelity. Other transducers, such as piezoelectric devices, are easily destroyed by heat or moisture. Still other known devices have a response which depends on the physical and electrical properties of the material used, which often introduces non-linear distortion, and may require accurate calibration. It is an object of the invention to produce a device which is free from the above defects.

Capacity pick-ups employing parallel plates are known which are sensitive to translational motion and, as a result, are extremely liable to generate unwanted signals resulting from resonances in their mechanical structure. It is an object of the invention to produce a capacity pick-up which is responsive only to rotational movements obtained in response solely to the lateral displacement of a phonograph pick-up needle point, in accordance with the tracing of a laterally-cut record groove.

Other objects are to provide a pick-up having low effective mass and high output, which does not require accurate mechanical positioning of the capacitor plates, and is insensitive to relative lateral or horizontal positioning of its relatively movable members. Thus extreme accuracy in assembling is not required and reasonable changes due to ageing, mechanical shock, etc., produce no appreciable effect on the output.

The specific nature of the invention, as well as other objects and advantages thereof, will clearly appear from a description of a preferred embodiment as shown in the accompanying drawing in which.

Figure 4:
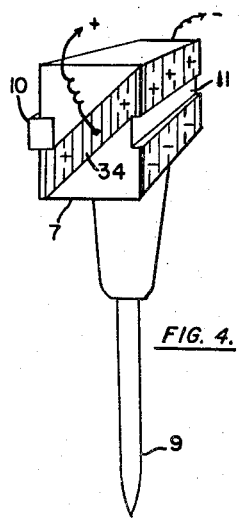
Figure 5:
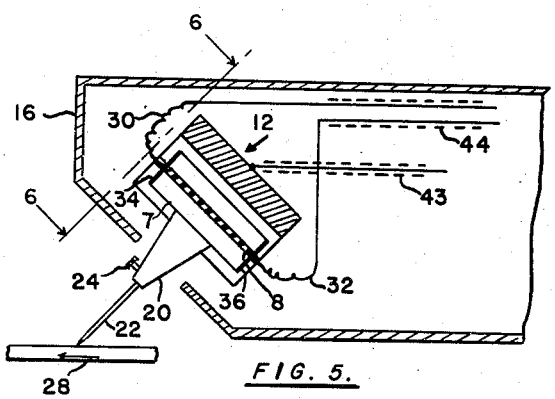
Figure 6:
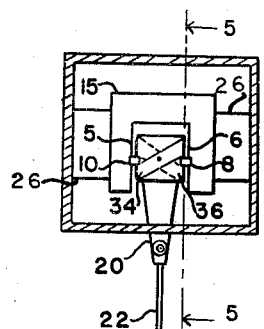

Figs. 3a, b, c are illustrative figures to show the correct principle of the compressed floating mounting;

Fig. 4 is a perspective view of the rotor element;

Fig. 5 is a sectional view of a phonograph pick-up embodying the invention, taken on line 5—5 of Fig. 6;

Fig. 6 is a sectional view taken on line 6—6 of Fig. 5; and

Figure 7:
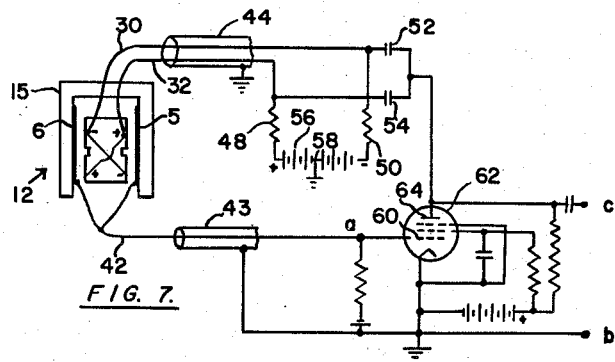

Fig. 7 is a circuit diagram of a prefered circuit arrangement for utilizing the improved pick-up.

Figure 1:
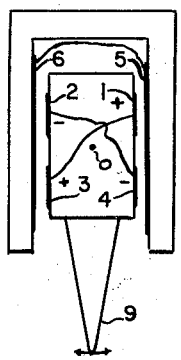
Fig. 1 is a schematic drawing illustrating the principle of the invention.

Fig. 1 is a cross-section of the pick-up showing the relationship of rotor to stator. The rotor rotates about axis O which runs through its center and parallel to the planes of the stator. 1, 2, 3 and 4 are parallel conducting films of equal area deposited on the surface of the rotor (a nonconductor), so that they are symmetrically arranged about the axis of rotation O. 5 and 6 are conducting films of greater area than the sides of the rotor and are held parallel and a fixed distance apart by being deposited on the stator which is a rigid and nonconducting assembly. The spacing between 5 and 6 is enough larger than the width of the rotor to allow an air space between 1, 4 and 5; and between 2, 3 and 6. The special suspension holds the rotor closely centered so that these air spaces are approximately equal. The suspension permits only rotation of the rotor about axis O, and very slight translation of the rotor vertically (parallel to 5 and 6). The mechanical signal is transmited to the rotor by means of the stylus 9 which is moved laterally as shown by the arrows, by the record groove, or vibrating object, producing rotation of the rotor about O.

The conducting surfaces on the rotor are alternately connected conductively: 1 to 3, and 2 to 4; and the stator surfaces are conductively connected. If one connected pair of rotor surfaces 1, 3, is maintained at some positive potential with respect to the stator surfaces and the other pair 2, 4, is held negative by the same amount, and if the tip of the stylus 9 is moved to the left (in Fig. 1) causing the rotor to turn about axis O, the positively charged surfaces are brought closer to the stator surfaces which the negatively charged surfaces are moved farther away. This causes the stator potential to become more positive due to the increase in capacity between itself and the positive surfaces and the decrease in capacity between itself and the negative surfaces. The total capacity between rotor and stator remains substantially constant for small rotations. But the potential of the stator varies linearly with the angle of rotation for small rotations because of the push-pull manner in which the charged rotor surfaces are made to influence the rotator surfaces.

The diagonal connection of the rotor surfaces, which gives sensitivity to rotational motion, effectively eliminates response to horizontal and vertical translational motion of the rotor, since the capacity between the stator and the positively charged rotor surfaces varies in exactly the same way as does the capacity between the stator and the negative rotor surfaces.

So long as the rotor remains wholly between the parallel stator conductive surfaces, vertical translational motion of it will generate no change of potential of the stator because all capacities between rotor and stator remain constant. This mimimizes the production of undesired signal components such as are due to "pinch effect," etc.

The symmetries of this particular design discriminate against all but one mode of mechano-electrical coupling: that resulting from rotation of the rotor about the axis O. Rotation about any other axis parallel to the one through O can be resolved into translation, and rotation about axis O, but translation has no effect.

Figure 2:
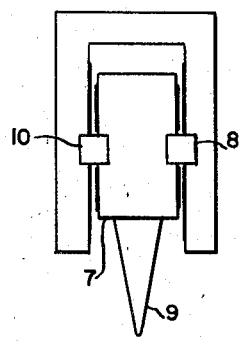
Fig. 2 is a drawing similar to Fig. 1, but illustrating the rotor mounting.

Referring to Figs. 2 and 4, it can be seen that the rotor 7 is positioned between the stator surfaces by two rubber strips 8 and 10 which run the full length of the rotor and are seated in shallow grooves 11 cut in the rotor exactly in the center of each rotor face. Similar grooves may also be cut in the stator (see Fig. 2).

These grooves serve two purposes: they hold the rubber strips in place; and they permit the use of a strip considerably thicker than the desired air space between rotor and stator. This last is particularly important.

Figure 3:
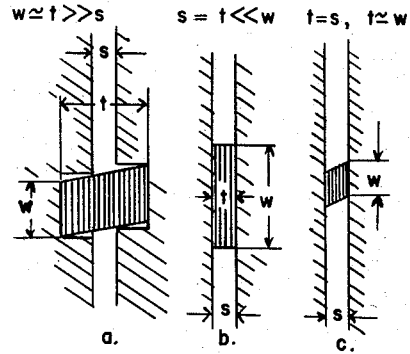

Referring to Fig. 3, it can be seen that if a large compressional force is applied against the rubber strips by the rotor, it will require a large force to displace the rotor to the right or left of its equilibrium position; thus the rotor is firmly positioned as far as horizontal motion is concerned. Now, if the ratio of $t$, rubber strip thickness, to $w$, rubber strip width, is very small, as shown in Fig. 3b, the rotor will also be firmly held against vertical motion, and it will be difficult to rotate. In other words, if $t/w$ is small, the rotor will be rigidly held. But if $t/w$ is not very small and $t \gg s$, as shown in Fig. 3a, and if there is considerable compression force the rotor will be held rigidly against horizontal motion, but will be relatively free to rotate about a central longitudinal axis, and to move vertically. This is the desired effect produced by the present design.

On the other hand, if $t/w$ is not small and if $t$ is equal to $s$, as shown in Fig. 3c, where $s$ is many times smaller than the distance from the rotor axis to the rubber strip, then $w$ will also be very much smaller than this distance and much greater deformation of the rubber strip will result from a given angular displacement of the rotor than would be the case of $t \gg s$. This is undesirable.

In addition to the above function of providing a rotational mounting, the rubber strips 8 and 10 also help to damp out resonances in the rotor and stator and they eliminate surface leakage between the oppositely charged rotor films in the region where these films come closest to each other.

Response of the rotor and stylus assembly to forces exerted at the stylus tip, assuming rotor suspended in stator as described, and that the stator is fixed, is as follows:

(1) A force exerted perpendicular to the stylus axis and in the plane of the rotor axis will give a large turning moment to the rotor, but this will be opposed by a large moment set up by shear in the rubber strips. Little turning results, and no signal output, as the distance between stator and rotor is unchanged.

(2) A force of the same magnitude exerted along the stylus axis will give no turning moment to the rotor, but will give a slight shear to the rubber strips causing the rotor to move vertically parallel to itself. This motion will be small for moderate forces. No signal output will result.

(3) A force of the same magnitude exerted perpendicular to the plane of the rotor axis will set up a large turning moment about the rotor axis. This will produce a considerable angular displacement of the rotor because of the mechanical advantage between the stylus tip and the the shear planes of the rubber strips resulting from the large ratio of stylus length to rotor half-thickness. Maximum signal output results.

The large ratio R of stylus length to radius of gyration of the rotor about its longitudinal axis give a great reduction in the equivalent mass of the rotor when referred to the stylus tip. The equivalent mass is $1/R^2$ times the actual rotor mass. If R is 10, a reduction of 100 is obtained.

Figs. 5 and 6 show schematically the embodiment of a capacitor unit 12, such as has been described, in a phonograph tone arm 16. The unit 12 consists of a stator 15 having opposed surfaces 5 and 6, and a rotor 7 mounted between the opposed surfaces of the stator by means of rubber strips 8 and 10, as previously described. A needle holder 20 is fixed to the under side of rotor 7 and holds a needle or stylus 22 by means of a conventional thumbscrew 24, or any other suitable stylus mounting may be used, such as, for example, a permanent needle directly mounted on the rotor. It will be clear that if the stylus and mounting are made sufficiently long to produce a substantial reduction in equivalent mass of the rotor referred to the stylus tip, then the stylus must be sufficiently rigid so that its compliance does not introduce objectional distortion, which involves an increasing mass as the stylus is lengthened, which tends to offset the reduction in equivalent mass of the rotor. However, a ratio of stylus length to radius of gyration in the order of 10 represents a reasonable compromise for practical applications.

Tone arm 16 may be of the usual hollow sheet metal construction, and unit 12 may be suitably mounted therein by means of insulating blocks 26, the whole being fastened in any desired practical manner. The above showing is by way of example only and it will be apparent that many modifications to suit particular structural requirements are possible. The point of stylus 22 is shown in contact with the surface of a record 28 moving in the direction indicated by the arrow. Rotor plate leads 30 and 32 are shown as brought out from the respective ends of the rotor, since a convenient and practical way to connect rotor plates 1 and 3 is by means of a diagonal conducting band 34 across the end surface of the rotor. Rotor plates 2 and 4 are similarly connected by a diagonal band 36 at the opposite end of the rotor. By tapping leads 30 and 32 from the respective centers of diagonal conductor strips 34 and 36, the minimum mechanical interference with the angular motion of the rotor is obtained, and since the taps can be thin, flexible loosely coiled wires, their mechanical effect on the rotor is entirely negligible.

It is obvious that the body of rotor 7 should be of insulating material. The plate surfaces 1 to 4 may be very thin conductive sheets of metal foil or film applied to the rotor surface by any suitable known technique as by spraying, deposition, or simply gluing on metal foil strips. Similarly the stator may be made of insulating material with applied opposed conducting surfaces electrically connected together, or may be formed of a single rectangular channel cut into a solid conducting block, which has the advantages of simplicity, ease of fabrication, and mechanical rigidity.

Alternatively, the rotor may have the unipotential electrical surface, and plates 1, 2, 3 and 4 may be located in place of the opposed surfaces 5 and 6 of the stator, the operation due to relative motion of rotor and stator being the same as before.

Referring now to Fig. 7, one manner of using the new pick-up unit with a suitable high-impedance circuit is shown. The circuit shown is related to that described in my prior U. S. Patent No. 2,598,259, for Signal Amplifying System, issued May 27, 1952, and possesses the advantages described in that patent in connection with a high-impedance transducer. The mode of transfer of energy between the transducer and circuit, and the manner of energizing the transducer are new and different from the showing of my prior patent and will be described in detail.

Leads 30 and 32 from the oppositely charged rotor plates are the same as shown in Fig. 5 and may both be enclosed in a single grounded shield 44. Polarizing potential for these leads is supplied through suitable resistors 48 and 50, which should be large compared with reactance of coupling condensers 52 and 54 at the lowest frequency to be transmited by these condensers. A battery 56 having a center grounded connection at 58 may be used to supply charging potential to the rotor plates, a suitable value being 500 volts between the positive and negative plates. It will be understood that instead of a battery, a very small transformer with thermionic or small selenium rectifiers may be used; or a voltage doubler or quadrupler arrangement from a 110 volt A. C. line may conveniently be used. Alternatively, an electric arrangement may be used which is a permanently charged condenser, eliminating the need for a separate voltage source. If a battery is used, it should be noted that it draws no current except for insulation leakage and therefore the battery would give full shelf life in use.

Stator plates 5, 6 are connected together to lead 42, which has a grounded shield 43, and is connected to grid 60 of pentode 62, which corresponds to pentode 6 of my prior patent, No. 2,598,259. A negative feedback connected from plate 64 to the pickup is supplied through coupling condensers 52 and 54. Points *a*, *b* and *c* of Fig. 7 correspond to points *a*, *b* and *c* of my prior patent, and the action in amplifying the power of the very high-impedance transducer is essentially the same as described in the patent and will not be repeated in detail. The cooperation between the patented circuit and the herein described transducer i. a. a particularly effective one in that the characteristics of the two are complementary, and in practice produces an undistorted signal of adequate amplitude which provides the advantages and fulfills the objectives of the invention.

It will be apparent that the embodiments shown are only exemplary and that various modifications can be made in construction and arrangement within the scope of my invention as defined in the appended claims.

I claim:

1. A mechano-electrical transducer comprising a stator member, a rotor member mounted for limited relative rotary motion bodily with respect to the said stator member about an axis of rotation, a pair of conductive surfaces on each member, one face of each surface of each member facing and closely spaced from a corresponding surface of the other member to form two opposed pairs of opposed surfaces on opposite sides of said axis of rotation, said surfaces having at least portions thereof at different radial distances from said axis of rotation, the surfaces on said stator member being of larger extent than the rotor surfaces and being electrically connected to form a continuous conducting surface, each of the said surfaces on the rotor member being divided into four separate conducting portions symmetrically disposed with respect to said axis of rotation the symmetrically opposed portions being electrically connected to form two additional pairs of surfaces, means for impressing opposite electrical polarities on said additional pairs of surfaces, and means for producing a change of rotational displacement between said members.

2. The invention according to claim 1 and a mounting for permitting said limited relative rotary motion between said members, said mounting comprising two strips of compressed resilient insulating material between the respective opposed surfaces of said two pairs, said surfaces having grooves parallel with said axis for retaining said strips, whereby the width of said strips is substantially greater than the spacing between said opposed strips.

3. An electrostatic transducer comprising a stator and a rotor, said stator having opposed spaced electrically connected conducting surfaces, said rotor being mounted between said surfaces for limited rotary motion as a whole about an axis, conducting surfaces carried by said rotor, one opposite each stator conducting surface and spaced therefrom, each said rotor surface being divided into two electrically separate portions symmetrically disposed with respect to said axis, said rotor surfaces being smaller in extent than said stator surfaces, diagonally opposite portions of the two rotor surfaces being electrically connected to form two diagonally connected pairs of surfaces.

4. The invention according to claim 3, and a mechanical force responsive member rigidly attached to said rotor for transmitting oscillatory forces applied to said member transverse to said axis into oscillations of said rotor about its axis.

5. The invention according to claim 4, and a rotor mounting comprising compressed strips of resilient material between respective pairs of opposed rotor-stator surfaces, said strips being oppositely and symmetrically disposed with respect to said axis and each strip being parallel to said axis, whereby shear flexing of said strips occurs in response to turning forces transmitted by said force responsive member, to permit limited rotary motion between stator and rotor.

6. The invention according to claim 5, said opposed surfaces having grooves parallel to said axis for retaining said strips.

7. The invention according to claim 6, each of said strips being of a width commensurate with the thickness of the strip and greater than the spacing between the opposed surfaces.

8. The invention according to claim 4, said force responsive member comprising a phonograph needle symmetrically mounted with respect to said rotor.

References Cited in the file of this patent

UNITED STATES PATENTS

| | | |
|---|---|---|
| 2,326,280 | Bauer | Aug. 10, 1943 |
| 2,481,886 | Sinnett | Sept. 13, 1949 |
| 2,568,797 | Eland | Sept. 25, 1951 |
| 2,668,245 | Rich | Feb. 2, 1954 |